US012523945B2

(12) United States Patent
Kikuchi

(10) Patent No.: US 12,523,945 B2
(45) Date of Patent: Jan. 13, 2026

(54) IMAGE FORMING APPARATUS FOR PREVENTING TRANSFER DEFECTS DUE TO ELECTRICAL DISCHARGE AND SUPPRESSING DEGRADATION OF SECONDARY TRANSFERABILITY

(71) Applicant: KYOCERA Document Solutions Inc., Osaka (JP)

(72) Inventor: Einosuke Kikuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/888,842

(22) Filed: Sep. 18, 2024

(65) Prior Publication Data

US 2025/0102943 A1 Mar. 27, 2025

(30) Foreign Application Priority Data

Sep. 25, 2023 (JP) ................................ 2023-159402

(51) Int. Cl.
*G03G 15/16* (2006.01)
*G03G 15/01* (2006.01)

(52) U.S. Cl.
CPC ..... *G03G 15/0131* (2013.01); *G03G 15/0189* (2013.01)

(58) Field of Classification Search
USPC ........................................................ 399/299
See application file for complete search history.

(56) References Cited

U.S. PATENT DOCUMENTS

2008/0304878 A1 12/2008 Matayoshi .................... 399/302
2018/0217530 A1* 8/2018 Kurokawa ............... H04N 1/29

FOREIGN PATENT DOCUMENTS

JP 2008-304780 A 12/2008

* cited by examiner

*Primary Examiner* — Quana Grainger
(74) *Attorney, Agent, or Firm* — Stein IP, LLC

(57) ABSTRACT

An image forming apparatus includes a plurality of image carrying members, a charging device, an exposure device, a developing device, an intermediate transfer belt, and a plurality of transfer rollers. On the image carrying member disposed most downstream in the traveling direction of the intermediate transfer belt, a black tonner image is developed. The rotation shaft of at least one transfer roller located upstream of the transfer roller disposed most downstream in the traveling direction of the intermediate transfer belt is offset upstream from directly above the rotation shaft of the corresponding image carrying member.

12 Claims, 8 Drawing Sheets

IMAGE FORMING APPARATUS FOR PREVENTING TRANSFER DEFECTS DUE TO ELECTRICAL DISCHARGE AND SUPPRESSING DEGRADATION OF SECONDARY TRANSFERABILITY

The present application is based on, and claims priority from, Japanese Patent Application No. No. 2023-159402 filed on Sep. 25, 2023, the disclosure of which is hereby incorporated by reference herein in its entirety.

BACKGROUND OF THE INVENTION

1. Field of the Invention

The present disclosure relates to an image forming apparatus.

2. Description of Related Art

A known image forming apparatus includes a plurality of image carrying members, an electrostatic charging device, an exposure device, a developing device, an intermediate transfer belt, and a plurality of transfer rollers. The charging device electrostatically charges the surfaces of the image carrying members. The exposure device exposes to light the surfaces of the image carrying members electrostatically charged by the charging device to form electrostatic latent images on the surfaces of the image carrying members. The developing device develops the electrostatic latent images formed on the surfaces of the image carrying members into toner images of different colors. To the intermediate transfer belt, the tonner images formed on the image carrying members are sequentially transferred. The transfer rollers are kept in pressed contact with the image carrying members via the intermediate transfer belt.

SUMMARY OF THE INVENTION

The rotation shaft of the transfer roller corresponding to black toner, disposed most downstream in the traveling direction of the intermediate transfer belt, is offset downstream from directly above the rotation shaft of the corresponding image carrying member. It is thus possible to suppress electric discharge and to reduce the scattering of black toner that makes noticeable stains.

BRIEF DESCRIPTION OF THE DRAWINGS

Employing the known technology above may cause defects in the transferred images of colors other than black.

DETAILED DESCRIPTION OF PREFERRED EMBODIMENTS

In view of the problem above, an object of the present disclosure is to provide an image forming apparatus that can improve the image quality of primarily transferred images.

To achieve the above object, according to a first configuration of the present disclosure an image forming apparatus includes a plurality of image carrying members, a charging device, an exposure device, a developing device, an intermediate transfer belt, and a plurality of transfer rollers. The charging device electrostatically charges the surfaces of the image carrying members. The exposure device exposes to light the surfaces of the image carrying members electrostatically charged by the charging device to form electrostatic latent images on the surfaces of the image carrying members. The developing device develops, by using developer containing toner, the electrostatic latent images formed on the surfaces of the image carrying members into toner images. To the intermediate transfer belt, the tonner images formed on the image carrying members are sequentially transferred. The transfer rollers are kept in pressed contact with the image carrying members via the intermediate transfer belt. On the image carrying member disposed most downstream in the traveling direction of the intermediate transfer belt, a black tonner image is developed. The rotation shaft of at least one transfer roller located upstream of the transfer roller disposed most downstream in the traveling direction of the intermediate transfer belt is offset upstream from directly above the rotation shaft of the corresponding image carrying member.

Other objects of the present disclosure, and specific advantages obtained from the present disclosure, will be clarified through the description of embodiments described below.

BRIEF DESCRIPTION OF THE DRAWINGS

Figure 1:
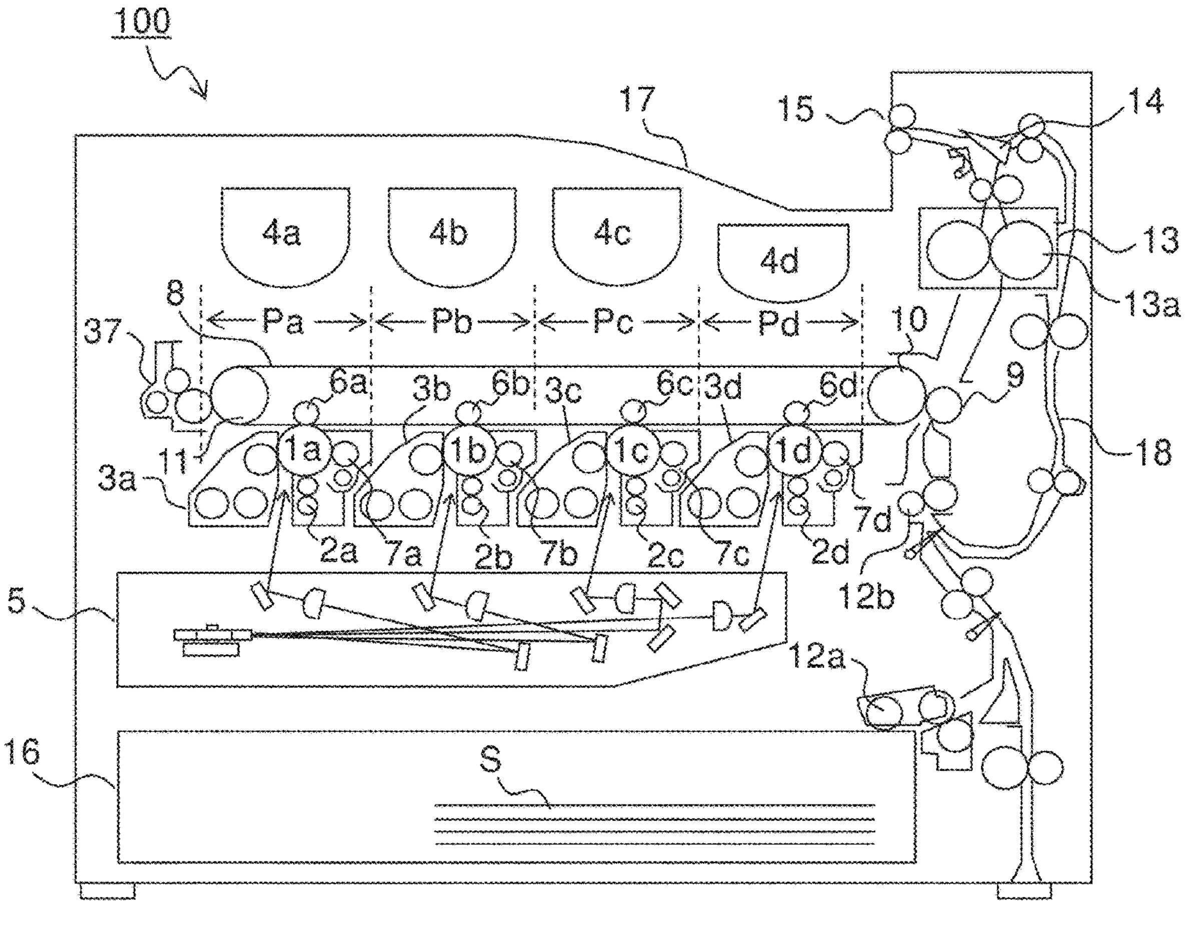
Figure 2:
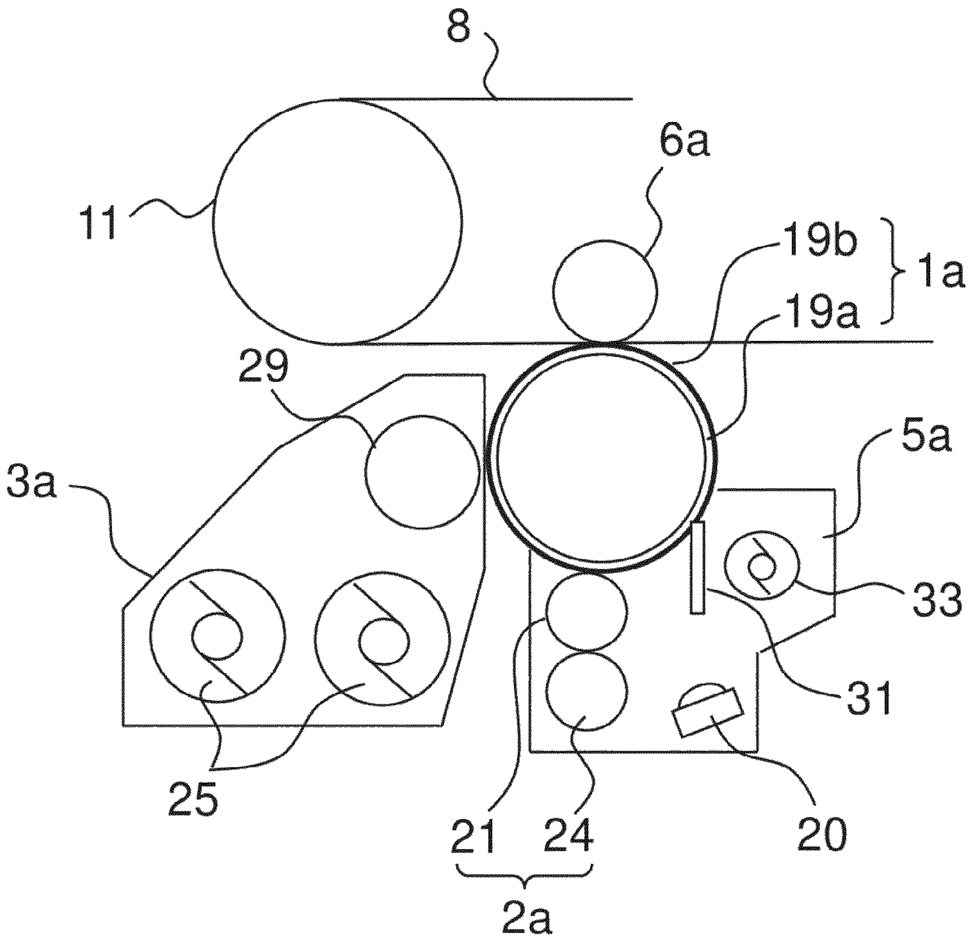
Figure 3:
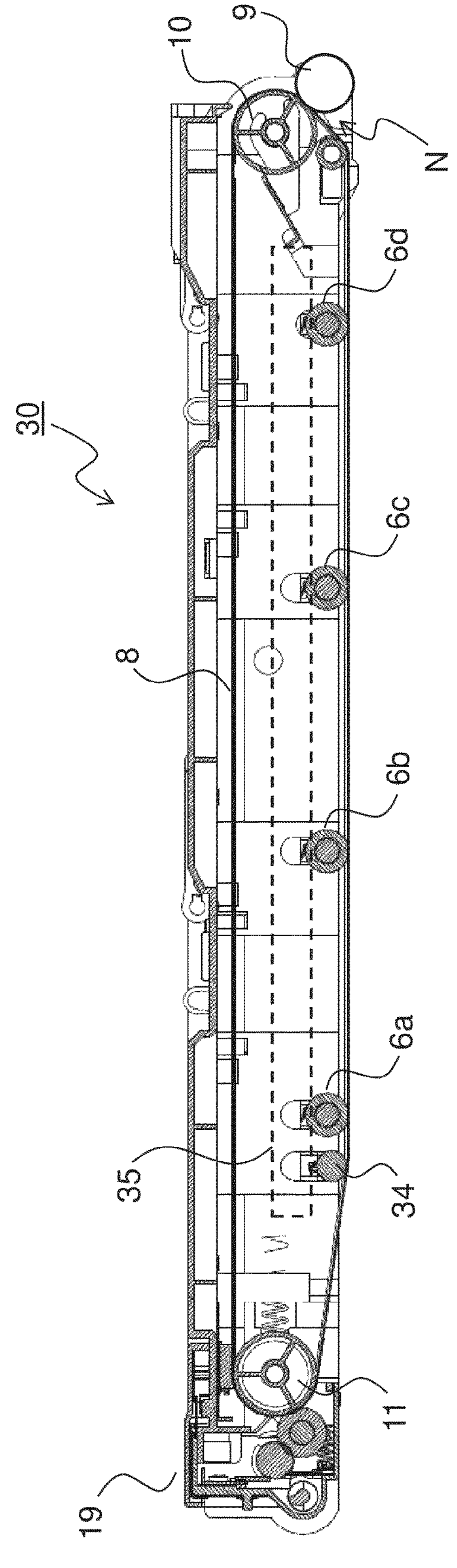
Figure 4:
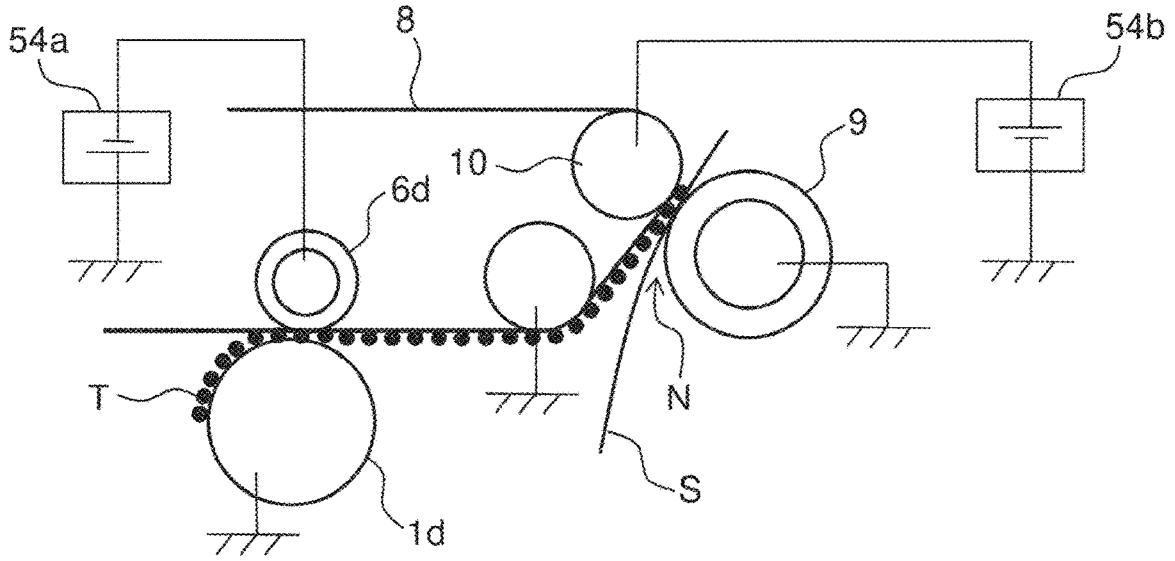
Figure 5:
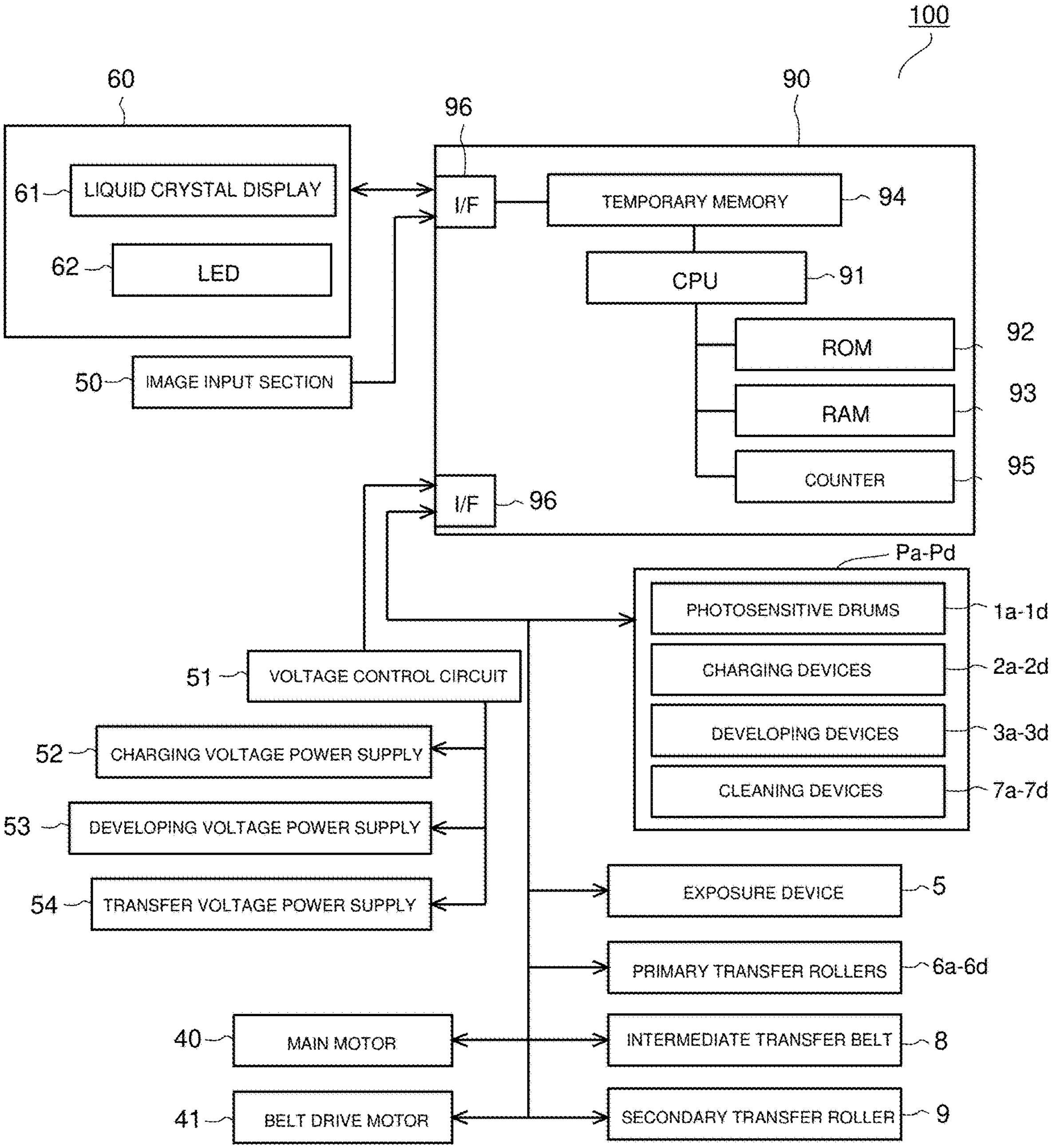
Figure 6:
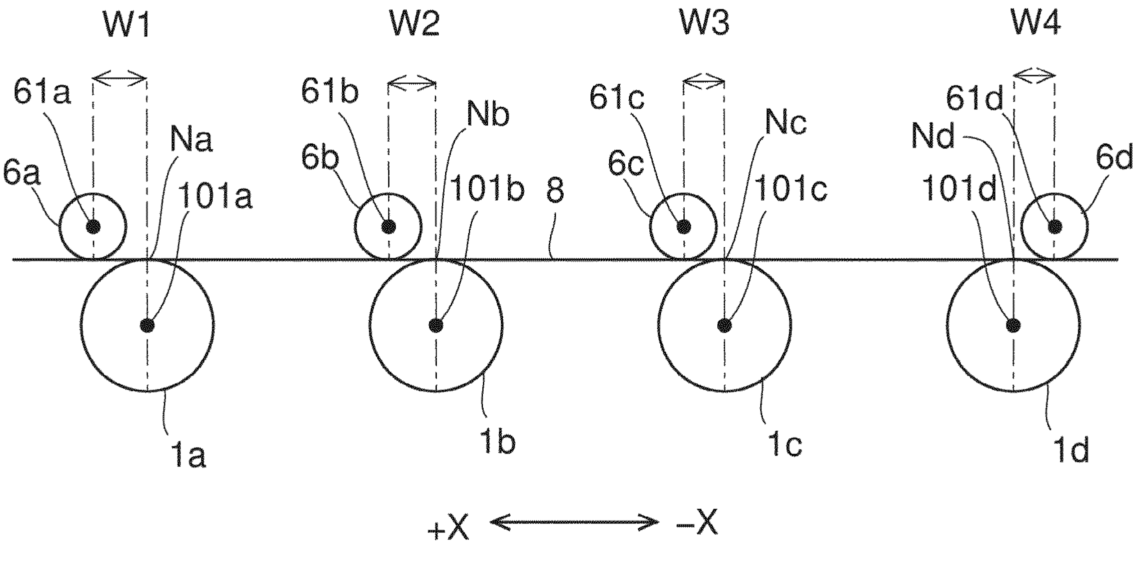

FIG. 1 is a schematic sectional diagram showing the overall construction of an image forming apparatus 100 according to one embodiment of the present disclosure;

FIG. 2 is an enlarged part view around an image forming section Pa in FIG. 1;

FIG. 3 is a side sectional view of an intermediate transfer unit 30 mounted in the image forming apparatus 100;

FIG. 4 is an enlarged part view around a primary transfer roller 6*d* and a secondary transfer nip N in the intermediate transfer unit 30;

FIG. 5 is a block diagram showing one example of control paths in the image forming apparatus 100;

FIG. 6 is a schematic sectional view of primary transfer rollers 6*a* to 6*d* and photosensitive drums 1*a* to 1*d;*

Figure 7:
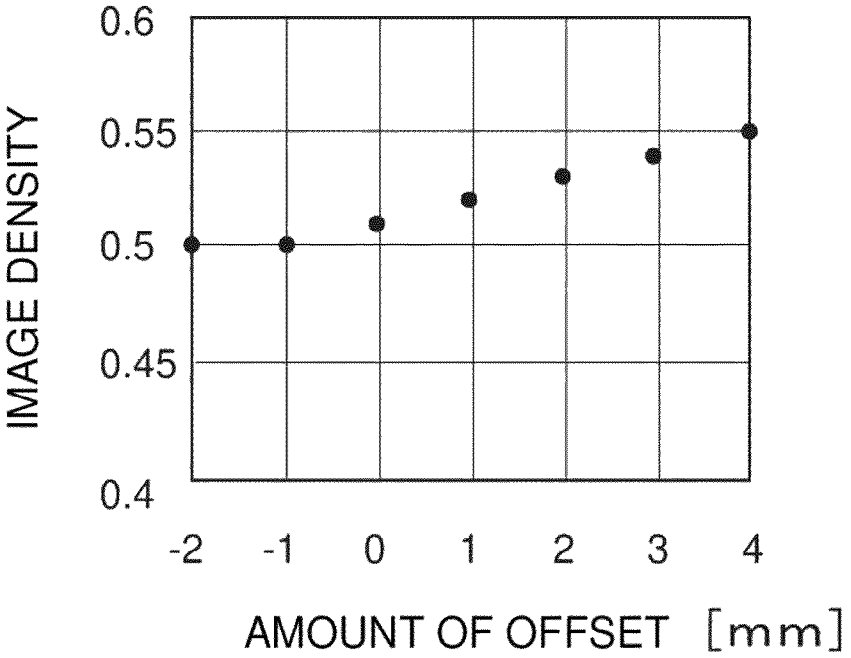
Figure 8:
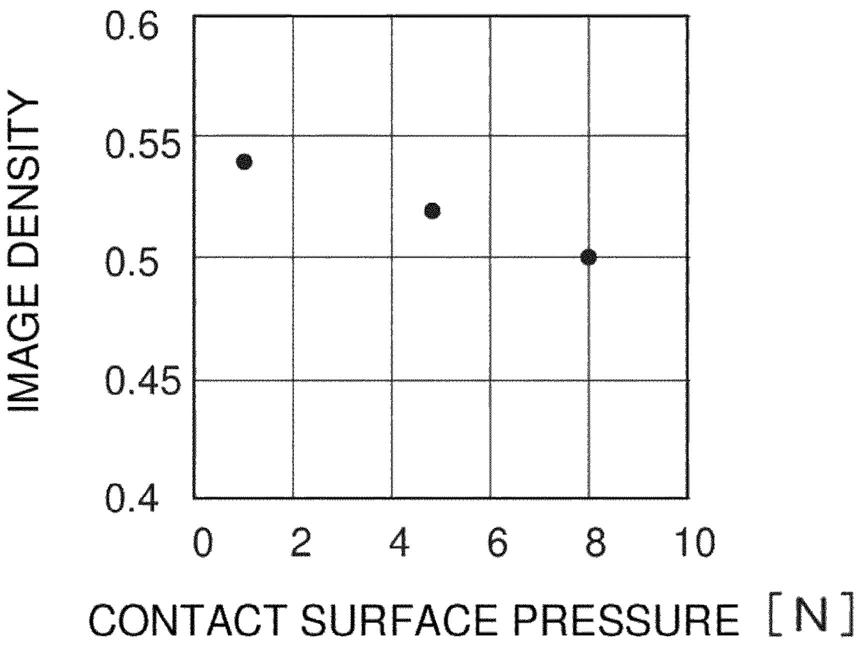

FIG. 7 is a graph showing the relationship of the amount of offset for the primary transfer roller 6*d* with image density; and FIG. 8 is a graph showing the relationship of the contact surface pressure between the primary transfer roller 6*d* and the intermediate transfer belt 8 with image density.

An embodiment of the present disclosure will be described in detail below with reference to the accompanying drawings. FIG. 1 is a schematic sectional diagram showing the construction of an image forming apparatus 100 according to one embodiment of the present disclosure. FIG. 2 is an enlarged part view around the image forming section Pa in FIG. 1. For other image forming sections Pb to Pd, which have basically a similar construction, no separate description will be given.

In a main body of the image forming apparatus 100 (hear, a color printer), the four image forming sections Pa, Pb, Pc, and Pd are arranged in this order from upstream (left side in FIG. 1) along the conveying direction. These image forming sections Pa to Pd are provided to correspond to four different colors (yellow, magenta, cyan, and black images) respectively and form a yellow, a magenta, a cyan, and a black image sequentially, each through the processes of electrostatic charging, exposure to light, image development, and image transfer.

In these imaging forming sections Pa to Pd, photosensitive drums 1*a*, 1*b*, 1*c*, and 1*d*, respectively, are disposed that carry visible images (toner images) of the different colors. Furthermore, an intermediate transfer belt 8, which is stretched around a plurality of rollers including a drive roller 10 and a tension roller 11 and which rotates in a counter-clockwise direction in FIG. 1, is provided to lie next to the image forming sections Pa to Pd. As shown in FIG. 2, around the photosensitive drum 1a, there are disposed a charging device 2a, a developing device 3a, a cleaning device 7a, and a static eliminating lamp 20 along the drum rotation direction (clockwise direction in FIG. 2), and across the intermediate transfer belt 8, a primary transfer roller 6a is disposed.

The photosensitive drums 1a to 1d are composed of a photosensitive base 19a and a photosensitive layer 19b formed on the surface of the photosensitive base 19a. In this embodiment, an amorphous silicon photosensitive layer is stacked as the photosensitive layer 19b on the surface of a cylindrical conductive base 19a made of aluminum.

The charging devices 2a to 2d have a charging roller 21 that makes contact with the photosensitive drum 1a and that applies a charging voltage (a DC voltage+an AC voltage) to the drum surface, and a charging cleaning roller 24 for cleaning the charging roller 21.

The developing devices 3a to 3d are of a two-component development type with two stirring/transferring screws 25 and a developing roller 29, and are loaded with predetermined amounts of two-component developer containing yellow, magenta, cyan, and black toner, respectively, and magnetic carrier. Using the two-component developer, a magnetic brush is formed on the surface of the developing roller 29, and a development voltage of the same polarity as the toner (here, positive polarity) is applied to the developing roller 29. In this state, the magnetic brush is brought into contact with, so as to attach the toner to, the surface of the photosensitive drum 1a to form a toner image.

As the proportion of toner in the two-component developer in the developing devices 3a to 3d falls below a prescribed value through the formation of toner mages, the developing devices 3a to 3d are supplied with toner form toner containers 4a to 4d.

When image data is fed in from a PC or another host device, first the main motor 40 (FIG. 5) starts to drive the photosensitive drums 1a to 1d to rotate. On the other hand, the belt drive motor 41 (FIG. 5) starts driving the intermediate transfer belt 8 to rotate. Next, the charging devices 2a to 2d electrostatically charge the surfaces of the photosensitive drums 1a to 1d uniformly with the same polarity as the tone (here, positive polarity). Next, the exposure device 5 shines light according to the image data onto the photosensitive drums 1a to 1d to form on them electrostatic latent images with electric charge attenuated according to the image data. The developers 3a to 3d then supply toner onto the photosensitive drum 1a to 1d to form toner images with the toner electrostatically attaching to them.

Then, the primary transfer rollers 6a to 6d apply a predetermined primary transfer electric field between themselves and the photosensitive drums 1a to 1d to primarily transfer to the intermediate transfer belt 8 the yellow, magenta, cyan and black toner images on the photosensitive drums 1a to 1d. The toner and the like remaining on the surfaces of the photosensitive drums 1a to 1d after primary transfer are removed by the cleaning devices 7a to 7d. The residual electric charge remaining on the surfaces of the photosensitive drums 1a to 1d after primary transfer is removed by the static eliminating lamp 20.

The transfer paper S to which the toner images are transferred is stored in a paper cassette 16 disposed in a lower part of the image forming apparatus 100. The transfer paper S is conveyed via a sheet feed roller 12a and a pair of registration rollers 12b, to the nip portion (secondary transfer nip portion) between the secondary transfer roller 9, which is provided next to the intermediate transfer belt 8, and the intermediate transfer belt 8 with predetermined timing. The transfer sheet S having the toner images on the intermediate transfer belt 8 secondarily transferred to it by the secondary transfer roller 9 is conveyed to the fixing section 13.

The transfer sheet S conveyed to the fixing section 13 is heated and pressed by a pair of fixing rollers 13a. The toner images are thus fixed to the surface of the transfer sheet S by a pair of fixing rollers 13a to form a predetermined full-color image.

The transfer paper S having the full-color image formed on it is discharged as it is (or after being sorted by a branch section 14 into a reversing conveyance path 18 to have images formed on both sides) by the pair of discharge rollers 15 to the discharge tray 17.

FIG. 3 is a side sectional view of the intermediate transfer unit 30 mounted in the image forming apparatus 100. As shown in FIG. 3, the intermediate unit 30 has an intermediate transfer belt 8, which is stretched between the drive roller 10 and the tension roller 11, primary transfer rollers 6a to 6d, which make contact with the photosensitive drums 1a to 1d via the intermediate transfer belt 8, and a pressure switching roller 34.

The intermediate transfer belt 8 is a resin belt mainly made of polyimide resin, for example, with a thickness of 40 to 100 [μm] and a Young's modulus of 3000 to 6000 [MPa].

The drive roller 10 and the tension roller 11 are disposed downstream and upstream, respectively, with respect to the traveling direction of the conveying surface (lower surface) of the intermediate transfer belt 8. Opposite the tension roller 11 is disposed a belt cleaning unit 37 for removing toner remaining on the surface of the intermediate transfer belt 8 (see FIG. 1). A secondary transfer roller 9 is pressed against the drive roller 10 via the intermediate transfer belt 8 to form a secondary transfer nip portion N.

The intermediate transfer unit 30 includes a roller contact/release mechanism 35. The roller contact/release mechanism 35 has a pair of support members (not shown) and a driving means (not shown). A pair of support members supports opposite end parts of the rotation shafts of the primary transfer rollers 6a to 6d and the pressure switching roller 34 such that these are rotatable and are movable in a direction (vertical direction in FIG. 3) perpendicular to the traveling direction of the intermediate transfer belt 8. The driving means reciprocates the primary transfer rollers 6a to 6d and the pressure switching roller 34 in the vertical direction. The roller contact/release mechanism 35 can be switched among a color mode, where the four primary transfer rollers 6a to 6d are pressed against the photosensitive drums 1a to 1d (see FIG. 1), respectively, via the intermediate transfer belt 8; in monochrome mode, where only the primary transfer roller 6d is pressed against the photosensitive drum 1d via the intermediate transfer belt 8; and a retraction mode, where all the four primary transfer rollers 6a to 6d are released from the photosensitive drums 1a to 1d.

FIG. 4 is an enlarged part view around the primary transfer roller 6d and the secondary transfer nip N in the intermediate transfer unit 30. The primary and secondary transfer of a toner image will now be described with reference to FIG. 4.

FIG. 4 shows a case with positively charged toner, that is, toner charged with a positive (plus) polarity.

As shown FIG. 4, a primary transfer voltage power supply 54a is connected to the primary transfer rollers 6a to 6d. A secondary transfer voltage power supply 54b is connected to the drive roller 10 (secondary transfer facing roller). When a control unit 90 (see FIG. 5) receives an image formation command, electrostatic latent images are formed on the surfaces of the photosensitive drums 1*a* to 1*d*, and then toner T is supplied from the developing devices 3*a* to 3*d* (see FIG. 2) so that toner images are formed. The toner images formed on the photosensitive drums 1*a*-1*d* move to the primary transfer nip portions Na to Nd as the photosensitive drums 1*a* to 1*d* (see FIG. 6) rotate.

A primary transfer voltage of a negative polarity (minus) is applied to the primary transfer rollers 6*a* to 6*d* by the primary transfer voltage power supply 54*a*.

Thus, the toner images on the photosensitive drums 1*a* to 1*d* are attracted to the primary transfer rollers 6*a* to 6*d* at the primary transfer nip portions Na to Nd and are primarily transferred to the intermediate transfer belt 8.

The toner images primarily transferred to the intermediate transfer belt 8 move to the secondary transfer nip portion N as the intermediate transfer belt 8 rotates.

A secondary transfer voltage of a positive (plus) polarity is applied to the drive roller 10 by the secondary transfer voltage power supply 54*b*. Thus, the toner images on the intermediate transfer belt 8 are conveyed to the secondary transfer nip portion N and are transferred to the transfer sheet S that passes through the secondary transfer nip portion N, under the potential difference between the drive roller 10, to which the secondary transfer voltage is applied, and the secondary transfer roller 9, which is grounded (earthed).

Next, the control paths in the image forming apparatus 100 of the present disclosure will be described. FIG. 5 is a block diagram showing one example of control paths used in the image forming apparatus 100 of the present disclosure. The control paths in the entire image forming apparatus 100 are complicated to achieve various kinds of control for different parts of the apparatus during use of the image forming apparatus 100. For simplicity's sake, the following description focuses on those control paths that are necessary for implementation of the present disclosure.

The control unit 90 at least includes a CPU (central processing unit) 91 as a central arithmetic processor, a ROM (read-only memory) 92 as a memory for reading only, a RAM (random-access memory) 93 as a readable and writeable memory, a temporary memory 94 for temporarily storing image data and the like, a counter 95 for cumulatively counting the number of sheets printed, and a plurality of (here, two) I/Fs (interfaces) 96 that transmit control signals and receive input signals from an operation unit 60. The control unit 90 can be arranged anywhere inside the main body of the image forming apparatus 100.

The ROM 92 stores a program for controlling the image forming apparatus 100 and data and the like that are not changed during use of the image forming apparatus 100, such as numerical values necessary for control.

The RAM 93 stores necessary data produced during control of the image forming apparatus 100 and data temporarily necessary for control of the image forming apparatus 100. The RAM 93 stores data and the like that are temporarily necessary for control of the image forming apparatus 100.

The control unit 90 transmits control signals from the CPU 91 to different parts and blocks in the image forming apparatus 100 through the I/Fs 96. On the other hand, from those parts and blocks, signals indicating their status and input signals are transmitted to the CPU 91 through the I/Fs 96. For example, the parts and blocks controlled by the control unit 90 include the image forming sections Pa to Pd, the exposure device 4, the primary transfer rollers (transfer rollers) 6*a* to 6*d*, the secondary transfer roller 9, the main motor 40, the belt drive motor 41, the image input section 50, the voltage control circuit 51, and the operation unit 60.

The image input section 50 is a receiving section that receives image data transmitted from a PC or the like to the image forming apparatus 100. An image signal input from the image input section 50 is converted to a digital signal, which is then sent to the temporary memory 94 via the I/F 96.

The voltage control circuit 51 is connected to a charging voltage power supply 52, a developing voltage power supply 53, and a transfer voltage power supply 54, and operates these power supplies according to an output signal from the control unit 90. These power supplies operate according to control signals from the voltage control circuit 51. The charging voltage power supply 52 applies a charging voltage to the charging rollers 21 in the charging device 2*a* to 2*d*. The developing voltage power supply 53 applies a developing voltage, which has a developing AC voltage superimposed on a developing DC voltage, to the developing rollers 29 in the developing devices 3*a* to 3*d*. The transfer voltage power supply 54 has a primary transfer voltage power supply 54*a* that applies a predetermined primary transfer voltage to the primary transfer rollers 6*a* to 6*d* and a secondary transfer voltage power supply 54*b* that applies a predetermined secondary transfer voltage to the drive roller 10 (for both, see FIG. 4).

The operation unit 60 has a liquid crystal display 61 and LEDs 62 indicating various states. The user operates a stop/clear button on the control unit 60 to stop image formation, and operates a reset button to set the various settings on the image forming apparatus 100 back to default settings. The LCD display 61 indicates the state of the image forming apparatus 100 as well as the image forming status and the number of copies printed. The various settings on the image forming apparatus 100 are made from a printer driver on the PC.

FIG. 6 is a schematic sectional view of the primary transfer roller 6*d* and photosensitive drives 1*a* to 1*d*, and shows the positional relationship of the photosensitive drums 1*a* to 1*d* and the primary transfer rollers 6*a* to 6*d* with the intermediate transfer belt 8. The upstream and downstream sides with respect to the travelling direction of the conveyance surface (lower surface) of the intermediate transfer belt 8 will be identified by +X and −X respectively.

The rotation shafts 61*a* to 61*c* of the primary transfer rollers 6*a* to 6*c*, which are located upstream −X of the primary transfer roller 6*d*, are offset upstream +X from directly above the rotation shafts 101*a*-101*c* of the corresponding photosensitive drums 1*a* to 1*c*. More specifically, the axes of the rotation shafts 61*a* to 61*c* of the primary transfer rollers 6*a* to 6*c* are offset upstream +X from the perpendicular lines passing through the axes of the rotation shafts 101*a* to 101*c* of the photosensitive drums 1*a* to 1*c*.

The rotation shaft 61*d* of the primary transfer roller 6*d*, which is located most downstream +X in the traveling direction of the intermediate transfer belt 8, is offset downstream −X from directly above the rotation shaft 101*d* of the corresponding photoconductive drum 1*d*. More specifically, the axis of the rotation shaft 61*d* of the primary transfer roller 6*d* is offset downstream −X from the perpendicular line passing through the axis of the rotation shafts 101*d* of the photosensitive drum 1*d*. While, in this embodiment, the rotation shaft 61*d* of the primary transfer roller 6*d* is offset downstream −X from directly above the rotation shaft 101*d* of the corresponding photosensitive drum 1*d*, it may instead be arranged directly above the rotation shaft 101*d* of the photosensitive drum 1*d*.

In color printing, brightness and transparency increase in the order of yellow, magenta, cyan, and black. On the other hand, visibility increases in the order of black, cyan, magenta, and yellow. Black toner, with high visibility, makes noticeable smudged when scattered.

In this embodiment, the primary transfer roller 6*d* corresponding to black toner, with lower brightness and transparency and higher visibility than yellow, magenta and cyan toners, is offset downstream-X with respect to the photosensitive drum 1*d*.

During primary transfer, electric discharge tends to occur downstream −X of the primary transfer nip Nd between the photosensitive drum 1*d* and the intermediate transfer belt 8. Here, offsetting the primary transfer roller 6*d* downstream −X with respect to the photosensitive drum 1*d* helps suppress electric discharge. It is thus possible to reduce the scattering of black toner, which makes noticeable stains, to improve color rendering and color reproduction in the transferred image. In addition, the reduced scattering of toner helps reduce toner consumption.

In this embodiment, the primary transfer rollers 6*a* to 6*c* are offset upstream +X with respect to the photosensitive drums 1*a* to 1*c*, and this makes it difficult to suppress electric discharge. On the other hand, as the width of the upstream +X offset is increased, the transferred image has an increased density when printed in halftone (halftone dots), that is, as collection of dots.

Yellow, magenta and cyan toners, which have higher brightness and transparency and lower visibility than black toner, make less noticeable stains than black toner when scattered. Thus, offsetting the primary transfer rollers 6*a* to 6*c* upstream +X with respect to the photosensitive drums 1*a* to 1*c* helps increase the image density of yellow, magenta, and cyan toners, thought causing the occurrence of character shagginess. In this way, it is possible to improve the image quality of the transferred image in primary transfer for colors except black.

Each primary transfer roller 6*a* to 6*c* has a different offset amount W1 to W3 relative to the photosensitive drum 1*a* to 1*c*. In this embodiment, the offset amount for toners with higher brightness and transparency and lower visibility is set to be larger. Specifically, the offset amount W1 for yellow toner is the largest, while the offset amount W3 for cyan toner is the smallest. Thus, for colors with low visibility and making less noticeable stains, the offset amount can be set large to increase image density. On the other hand, for colors with low visibility and making noticeable stains, the offset amount can be set to be small to reduce toner scattering. This reduces toner consumption due to scattering and improves color rendering and color reproduction in the transferred image for colors with low visibility and making noticeable stains. Thus, the optimal balance between the reproducibility of the transferred image and the image density can be adjusted based on the offset amount.

In addition, as the contact surface pressure between the primary transfer rollers 6*a* to 6*d* and the intermediate transfer belt 8 is increased, the occurrence of character shagginess can be suppressed, and the color rendering and color reproduction in the transferred image can be improved. Specifically, as the contact surface pressure is increased, the cohesive force between toner particles increases. It is thus possible to reduce toner scattering in a small electric discharge area that appears near the primary transfer nips Na to Nd. In other words, increasing the contact surface pressure provides the same effect as offsetting the primary transfer roller 6*d* downstream-X with respect to the photosensitive drum 1*d*.

In this embodiment, the contact surface pressure between the primary transfer roller 6*d* for black toner and the intermediate transfer belt 8 is higher than that between the primary transfer rollers 6*a* to 6*c* for yellow, magenta, cyan toner and the intermediate transfer belt 8. It is thus possible to reduces more the scattering of black toner and suppress more the occurrence of character shagginess. Thus, the color reproduction and color reproducibility of the transferred image can be improved more. In addition, reducing black toner scattering helps further reduce the amount of black tonner consumed.

On the other hand, increasing the contact surface pressure between the primary transfer rollers 6*a* to 6*d* and the intermediate transfer belt 8 results in higher image density in printing in halftone (halftone dots). In other words, reducing the contact surface pressure provides the same effect as offsetting the primary transfer rollers 6*a* to 6*c* upstream +X relative to the photosensitive drums 1*a* to 1*c*.

In this embodiment, the contact surface pressures between the primary transfer rollers 6*a* to 6*c* and the intermediate transfer belt 8*d* differ from each other. Specially, the contact surface pressure for a color with higher brightness and transparency and lower visibility is set higher. Specifically, the contact surface pressure for yellow toner is the lowest while the contact surface pressure for cyan toner is the highest. Thus, for colors with low visibility and making less noticeable stains, the surface pressure can be set low to increase the image density.

On the other hand, for colors with low visibility and making noticeable stains, the contact surface pressure can be set higher to further reduce toner scattering. In this way, for colors with low visibility and making noticeable stains, it is possible to reduce toner consumption due to scattering and improve the color rendering and color reproduction of the transferred image. It is thus possible to adjust the optimal balance between the reproducibility of the transferred image and the image density based on the contact surface pressure.

Next, the relationship between the amount of offset of the primary transfer roller and the image density is described. The relationship between the contact surface pressure and the image density in printing in halftone (halftone dots) is also described. As a test machine, an intermediate transfer type image forming apparatus 100 (manufactured by Kyocera Document Solutions) as shown in FIG. 1 was used and the image density was measured while the offset amount and the contact surface pressure of the primary transfer roller 6*d* were changed.

The intermediate transfer belt 8 was made of polyimide resin, and was stretched from opposite sides with springs as a stretching tension for the intermediate transfer belt 8.

The primary transfer roller 6*d* was a sponge roller made of EPDM, and springs were provided on opposite sides of it in the axial direction such that the load on the primary transfer roller 6*d* was variable. The primary transfer current flowing through the primary transfer roller 6*d* was −5 to −50 [μA]. The development biases were AC 500 to 1400 [V] and Vdc 80 to 250 [V].

The photosensitive drum 1*d* used was an amorphous silicon photosensitive drum that had an amorphous silicon layer as the photosensitive layer 19*b* and that had an OPC photosensitive drum (manufactured by Kyocera Document Solutions) with a positively charged single layer OPC photosensitive layer as the photosensitive layer 19*b*. The toner used was positively charged toner.

Relationship Between the Amount of Offset and the Image Density

The relationship of the amount of offset of the primary transfer roller 6*d* with the image density was examined. The test proceeded as follows. The offset amount W4 of the primary transfer roller 6*d* was varied in seven steps of −2 [mm], −1 [mm], 0 [mm], +1 [mm], +2 [mm], +3 [mm], +4 [mm], and +5 [mm]. [The offset amount The black image density was measured in printing in halftone (halftone dots). The results are shown in the graph in FIG. 7. Note that, when the offset amount is negative, the axis of the primary transfer roller 6*d* is shifted downstream −X from the perpendicular line passing through the axis of the rotation shaft 101*dc* of the photosensitive drum 1*d*; by contrast, when the offset amount is positive, the axis of the primary transfer roller 6*d* is shifted upstream +X from the perpendicular line passing through the axis of the center of the rotation shafts 101*dc* of the photosensitive drum 1*d*.

Relationship Between the Contact Surface Pressure and the Image Density

The relationship with the contact surface pressure between the photosensitive drum 1*d* and the intermediate transfer belt 8 with the image density was examined. The test proceeded as follows. While the contact surface pressure between the photosensitive drum 1*d* and the intermediate transfer belt 8 was varied in three steps of 1 [N], 5 [N], and 8 [N], the black image density in printing in halftone (halftone dots) was measured. The results are shown in the graph in FIG. 8.

From the above relationships, it has been confirmed that the image density in printing in halftone (halftone dot) increases as the amount of the upstream +X offset is increased. It has also been confirmed that as the contact surface pressure is increased, the image density in printing in halftone (halftone dots) decreases. It has thus been confirmed that the optimal balance between the reproducibility of the transferred image and the image density can be adjusted based on the offset amount and the contact surface pressure.

The embodiments described above are not meant to limit the scope of the present disclosure, which thus allows for any modifications without departure from the scope of the present disclosure. For example, the present disclosure can be applied not only to tandem-type color printers as shown in FIG. 1, but to various image forming apparatus, MFPs, and the various other image forming apparatus, such as color copiers and color multifunction peripherals, that use an intermediate transfer method in which a toner image formed on a photosensitive drum is primarily transferred to an intermediate transfer belt.

In this embodiment, the rotation shafts of the primary transfer rollers 6*a* to 6*c* that are located upstream +X of the primary transfer roller 6*d* are offset upstream +X from directly above the rotation shafts of the corresponding photosensitive drums 1*a* to 1*c*. It is however sufficient if the rotation shaft of at least one of the primary transfer rollers 6*a* to 6*c* is offset upstream +X from directly above the rotation shaft of the corresponding photosensitive drum 1*a*-1*c*.

In this embodiment, the image forming sections Pa to Pd are arranged in the order of yellow, magenta, cyan, and black from up to downstream −X. However, the order of yellow, magenta, and cyan is not meant as a limitation as long as black is placed most downstream.

The present disclosure finds application in image forming apparatuses using an intermediate transfer method that transfer a toner image formed on an image carrying member such as a photosensitive drum to an intermediate transfer belt. Based on the present disclosure, it is possible to provide an image forming apparatus capable of forming high quality images over a long period of time by preventing transfer defects due to electrical discharge and suppressing the degradation of secondary transferability even for sheets with a rough surface.

What is claimed is:

1. An image forming apparatus comprising:

a plurality of image carrying members;

a charging device for electrostatically charging surfaces of the image carrying members;

an exposure device for exposing to light the surfaces of the image carrying members electrostatically charged by the charging device to form electrostatic latent images on the surfaces of the image carrying member;

a developing device for developing the electrostatic latent images formed on the surfaces of the image carrying members into toner images; and an intermediate transfer belt to which the toner images formed on the image carrying members are sequentially transferred a plurality of transfer rollers kept in pressed contact with the image carrying members via the intermediate transfer belt, wherein on the image carrying member disposed most downstream in a traveling direction of the intermediate transfer belt on a conveyance surface for the toner image, a black tonner image is developed, and an axis of a rotation shaft of at least one transfer roller disposed upstream of the transfer roller disposed most downstream in the traveling direction of the intermediate transfer belt on the conveyance surface for the toner image is offset to upstream of a perpendicular line that passes through an axis of a rotation shaft of a corresponding image carrying member and that is perpendicular to the traveling direction.

2. The image forming apparatus according to claim 1, wherein the rotation shaft of the transfer roller disposed most downstream in the traveling direction of the intermediate transfer belt is offset to on, or to downstream of, the perpendicular line that passes through the axis of the rotation shaft of a corresponding image carrying member and that is perpendicular to the traveling direction.

3. The image forming apparatus according to claim 1, wherein the transfer rollers disposed upstream of the transfer roller disposed most downstream in the traveling direction of the intermediate transfer belt on the conveyance surface for the toner image are given different offset amounts with respect to the image carrying members.

4. The image forming apparatus according to claim 1, wherein the transfer roller disposed most downstream in the traveling direction of the intermediate transfer belt on the conveyance surface for the toner image is given a higher contact surface pressure against the intermediate transfer belt than a transfer roller disposed upstream of the transfer roller disposed most downstream.

5. The image forming apparatus according to claim 4, wherein wherein the transfer rollers disposed upstream of the transfer roller disposed most downstream in the traveling direction of the intermediate transfer belt on the conveyance surface for the toner image are given different contact surface pressures against the intermediate transfer belt.

6. The image forming apparatus according to claim 1, wherein on the image carrying members disposed upstream of the image carrying member disposed most downstream in the traveling direction of the intermediate transfer belt on the conveyance surface for the toner image, a yellow toner image, a magenta toner image and a cyan toner image are developed sequentially from up to the downstream.

7. An image forming apparatus comprising:

a plurality of image carrying members;

a charging device for electrostatically charging surfaces of the image carrying members;

an exposure device for exposing to light the surfaces of the image carrying members electrostatically charged by the charging device to form electrostatic latent images on the surfaces of the image carrying member;

a developing device for developing the electrostatic latent images formed on the surfaces of the image carrying members into toner images; and an intermediate transfer belt to which the toner images formed on the image carrying members are sequentially transferred a plurality of transfer rollers disposed opposite the image carrying members via the intermediate transfer belt, wherein on the image carrying member disposed most downstream in a traveling direction of the intermediate transfer belt on a conveyance surface for the toner image, a black tonner image is developed, and an axis of a rotation shaft of at least one transfer roller disposed upstream of the transfer roller disposed most downstream in the traveling direction of the intermediate transfer belt on the conveyance surface for the toner image is offset to upstream of a perpendicular line that passes through an axis of a rotation shaft of a corresponding image carrying member and that is perpendicular to the traveling direction.

8. The image forming apparatus according to claim 7, wherein the rotation shaft of the transfer roller disposed most downstream in the traveling direction of the intermediate transfer belt is offset to on, or to downstream of, the perpendicular line that passes through the axis of the rotation shaft of a corresponding image carrying member and that is perpendicular to the traveling direction.

9. The image forming apparatus according to claim 7, wherein the transfer rollers disposed upstream of the transfer roller disposed most downstream in the traveling direction of the intermediate transfer belt on the conveyance surface for the toner image are given different offset amounts with respect to the image carrying members.

10. The image forming apparatus according to claim 7, wherein the transfer roller disposed most downstream in the traveling direction of the intermediate transfer belt on the conveyance surface for the toner image is given a higher contact surface pressure against the intermediate transfer belt than a transfer roller disposed upstream of the transfer roller disposed most downstream.

11. The image forming apparatus according to claim 10, wherein wherein the transfer rollers disposed upstream of the transfer roller disposed most downstream in the traveling direction of the intermediate transfer belt on the conveyance surface for the toner image are given different contact surface pressures against the intermediate transfer belt.

12. The image forming apparatus according to claim 7, wherein on the image carrying members disposed upstream of the image carrying member disposed most downstream in the traveling direction of the intermediate transfer belt on the conveyance surface for the toner image, a yellow toner image, a magenta toner image and a cyan toner image are developed sequentially from up to the downstream.

* * * * *